3,417,178
CASTING PROCESS FOR FORMING A SOLID
POLYLACTAM ARTICLE
Frank P. Downing, Succasunna, John M. Kolyer, Convent, and Vincent J. Opalewski, Rockaway Township, Morris County, N.J., assignors to Allied Chemical Corporation, New York, N.Y., a corporation of New York
No Drawing. Filed Feb. 10, 1966, Ser. No. 526,372
8 Claims. (Cl. 264—331)

ABSTRACT OF THE DISCLOSURE

Solid polylactam articles substantially free of internal voids may be prepared by adding a polymerizable mixture comprising the lactam, a promoter and an anionic catalyst to a mold at a rate such that polymerization concludes first in the bottom of the mold and proceeds upward toward the source of feed at a rate substantially equal to the rate of rise of mixture in the mold and there is present immediately above the polymerized material a layer of substantially unpolymerized mixture.

---

This invention relates to the preparation of shaped polylactam bodies and more particularly relates to preparing large castings essentially free of voids from lactams containing an anionic polymerization catalyst and a polymerization promoter, e.g., anionically polymerized nylon (A.P. nylon).

When solutions of cyclic lactams, such as, for example, e-caprolactam, laurolactam, enantholactam, caprylic-lactam or mixtures thereof containing a suitable anionic polymerization catalyst and promoter, are heated to a sufficiently high temperature they may be polymerized in molds to form solid bodies. This polymerization reaction involves considerable shrinkage or contraction of the reaction mass since, for example, a lactam monomer having a specific gravity of 0.95 (at 160° C.) is converted to a solid polymer having a specific gravity of 1.15 (at room temperature).

In the production of large bodies, for example, bodies weighing more than one pound and having a diameter of more than one inch for a rod or 2 inches for a sphere, it is very difficult to prevent formation of internal voids. When mold cavities of substantial size are filled rapidly with monomer so that polymerization proceeds at about the same rate throughout the mass, part of the shrinkage involved is relieved by formation of internal voids. The formation of internal voids renders the molded products unsuitable for many uses and is particularly disadvantageous where a machining operation is to be performed on the product.

Heretofore castings low in voids from anionically polymerized e-caprolactam were sought principally through centrifugal casting or casting after partial polymerization (prepolymerization). While the centrifugal method is practical for many items it is relatively costly especially for large castings. Prepolymerization introduces variability in the products through difficulty in providing partial polymer of constant composition from batch to batch.

It has now been found that if a reaction mixture comprising catalyzed lactam monomer is fed into a mold at a rate which causes the level of material in the mold to rise at a sufficiently slow rate, the formation of internal shrinkage voids may be eliminated. When catalyzed monomer is slowly added to a mold in accordance with the present invention polymerization is concluded first in the bottom of the mold at a location remote from the source of feed and the boundary between solid polymer and polymerizing monomer moves slowly upward toward the source of feed. The internal shrinkage accompanying gradual formation of solid polymer is relieved by drawing down partially polymerized monomer from the layer above into the space created by said shrinkage. In addition to eliminating more or less spherical internal voids, gradual addition of catalyzed monomer in accordance with the present invention alleviates formation of a cavern-like sink at the upper surface of the casting.

The maximum rate of rise of the level of material in a mold which may be used is controlled by mold temperature, the temperature of the lactam reaction mixture, and catalyst and promoter concentrations. In general, when higher temperatures and higher catalyst and promoter concentrations are employed higher rates of rise are permissible, e.g., rates of rise as high as about 4 inches per minute may be used without formation of internal voids. Since, when other variables are fixed, the maximum rate of rise of the level of material in the mold is critical, it will be obvious that if the cross-section of the mold varies with respect to height it may be necessary to vary the rate of feeding during the casting process to maintain a constant rate of rise, which does not exceed the maximum.

As indicated above the maximum rate of rise employed is critical in avoiding formation of internal shrinkage voids. While any rate of rise not above the maximum which will prevent formation of voids may be employed, it has been found that if the rate is too slow irregularities, e.g., pin holes or striations will be produced in the casting. In general the rate of rise should be sufficient to maintain substantially the entire upper surface of material in the mold as a layer of essentially unpolymerized lactam reaction mixture. Where small or shallow molds are used the rate of rise should be sufficiently slow so that the total time required to fill the mold is at least twice the gel time of the reaction mixture. To avoid turbulence in the reaction mixture the mold may be tilted and the reaction mixture allowed to run down the side of the mold.

In carrying out the process of the present invention it is obvious that the entire monomer batch needed to fill a given mold cavity cannot be catalyzed at once since polymerization would take place in the supply reservoir before all of the monomer could be fed to the mold. A convenient way of overcoming this problem is to bring together two separate streams of monomer, one containing catalyst and one containing promoter, in a mixing T and feeding the resulting mixture to the mold.

In a typical practice of the process of the present invention, a catalyst containing monomeric lactam solution is prepared by heating from 0.02 to 0.12 part lithium hydride with 100 parts dry (less than 50 p.p.m. water) caprolactam at 95° C. for four hours and a promoter solution is prepared by dissolving 0.08 to 0.50 part triphenoxy-s-triazine in 100 parts of molten caprolactam. The solutions are placed in separate reservoirs directed at equal rates to a mixing T and thence into the mold. The temperature of the reaction mixture should be maintained at 140 to 200° C. during polymerization and it is preferable to maintain the mold in this temperature range during addition of the reaction mixture. The feed rate into the mold should be controlled so as to keep the rate of rise of material in the mold at a value which will produce a casting free of voids.

Any anionic polymerization catalyst may be used in the process of the present invention. Particularly good results are obtained using metal iminium salts of lactams such as lithium salt of e-caprolactam. Useful promoters include triphenoxy-s-triazine, tris(p - chlorophenyl) thiocyanurate and N-acetyl caprolactam. Suitable catalyst/promoter system for anionic polymerization of lactams are disclosed in U.S.P. 3,017,391, U.S.P. 3,018,273, French Patent 1,349,-953 and British Patent 924,453.

It is to be understood that particulate fillers or other additives may be used in preparing castings in accordance with the process of the present invention, for example, carbon black may be incorporated into the casting by adding it to the promoter solution and maintaining agitation in the feed supply reservoir during the slow feeding process. A very uniform dispersion of the filler is obtained by the feeding process of the present invention, whereas in conventional casting processes the filler tends to settle out. In addition to the use of particulate fillers the mold may be loaded with reinforcement material, e.g., glass fibers or wire screening in the casting process of the present invention.

The following illustrates the present invention and the best mode contemplated for practicing the same:

A catalyst solution was perpared by heating 0.12 part lithium hydride with 100 parts dry (less than 50 p.p.m. water) molten caprolactam at 95° C. for four hours. A promoter solution was prepared by dissolving 0.50 part triphenoxy-s-triazine in 100 parts of dry molten caprolactam. The two solutions were placed in separate reservoirs and directed at equal rates to a mixing T. The mixture from the T, having a temperature of about 140° C. was slowly fed into molds of various shapes heated at about 160 to 165° C. Castings free of voids were obtained at the following rates of rise:

| Mold | Cross section | Rate of rise |
|---|---|---|
| Round bar | 15.9 sq. in. | 0.97″/min. |
| Hollow cone | 2.4 sq. in. (sm. end) | 4.0 ″/min. |
|  | 8.4 sq. in. (lge. end) | 1.1 ″/min. |
| Slipper block | 6.5 sq. in. (sm. end) | 1.5 ″/min. |
|  | 9.6 sq. in. (lge. end) | 1.0 ″/min. |

In the above described procedure essentially the same results were obtained using 0.72 part tris-(p-chlorophenyl) thiocyanurate as a promoter.

In a procedure similar to that described above 12.5 grams of laurolactam were added to each of the catalyst and promoter solutions. A spherical casting free of voids was produced containing 11% laurolactam and 89% caprolactam.

We claim:

1. A method of preparing a molded solid polylactam article substantially free of internal voids, which method comprises preparing a polymerizable mixture comprising the lactam and a promoter and anionic catalyst for polymerizing said lactam and then prior to any substantial polymerization of said mixture, adding the mixture to a mold, heated to a temperature sufficient to effect polymerization, at a rate such that polymerization concludes first in the bottom of the mold at a location remote from the source of feed and proceeds upward toward the source of feed at a rate substantially equal to the rate of rise of mixture in the mold, which rate is not greater than about 4 inches per minute, and during the period of addition there is present immediately above the polymerized material a layer of substantially unpolymerized mixture.

2. The method claim 1 wherein said lactam comprises e-caprolactam.

3. The method of claim 1 wherein said anionic polymerization catalyst comprises a metal iminium salt of a lactam.

4. The method of claim 3 wherein said catalyst is a lithium salt of e-caprolactam.

5. The method of claim 1 wherein said promoter is selected from the group consisting of triphenoxy-s-triazine and tris (p-chlorophenyl) thiocyanurate.

6. The method of claim 1 wherein said mixture contains a particulate filler.

7. The method of claim 1 wherein said mixture is obtained by combining a solution of lactam containing said anionic polymerization catalyst with a solution of lactam containing said promoter.

8. The method of claim 1 wherein the rate of rise is not less than one inch per minute.

References Cited

UNITED STATES PATENTS

| | | |
|---|---|---|
| 3,018,273 | 1/1962 | Butler et al. _____ 260—309.5 |
| 3,121,768 | 2/1964 | Boyer _____ 264—331 |
| 3,216,976 | 11/1965 | Schwartz et al. |
| 3,228,759 | 1/1966 | Small et al. |
| 3,322,696 | 5/1967 | Fisher et al. |

ROBERT F. WHITE, *Primary Examiner.*

G. AUVILLE, *Assistant Examiner.*

U.S. Cl. X.R.

260—78